United States Patent
Cho et al.

(10) Patent No.: US 7,799,470 B2
(45) Date of Patent: Sep. 21, 2010

(54) NON-AQUEOUS-ELECTROLYTE AND LITHIUM SECONDARY BATTERY USING THE SAME

(75) Inventors: Jeong Ju Cho, Daejeon (KR); Sun Sik Shin, Daejeon (KR); Hyang Mok Lee, Seoul (KR); Kyong Won Kang, Daejeon (KR); Eun Ju Kang, Daejeon (KR); Min Chul Jang, Daejeon (KR); Soo Hyun Ha, Busan (KR)

(73) Assignee: LG Chem, Ltd. (KR)

( * ) Notice: Subject to any disclaimer, the term of this patent is extended or adjusted under 35 U.S.C. 154(b) by 767 days.

(21) Appl. No.: 11/625,999

(22) Filed: Jan. 23, 2007

(65) Prior Publication Data

US 2007/0172729 A1   Jul. 26, 2007

(30) Foreign Application Priority Data

Jan. 23, 2006   (KR)   ................ 10-2006-0006692

(51) Int. Cl.
*H01M 10/05* (2010.01)
(52) U.S. Cl. ................ 429/332; 429/199; 429/200; 429/326
(58) Field of Classification Search .............. None
See application file for complete search history.

(56) References Cited

U.S. PATENT DOCUMENTS

2004/0197667 A1*  10/2004  Noh et al. .............. 429/326
2005/0118512 A1    6/2005  Onuki et al.

FOREIGN PATENT DOCUMENTS

| JP | 2000040526 A | 2/2000 |
| JP | 2003257479 A | 9/2003 |
| JP | 2004342607 A | 12/2004 |
| KR | 1020040092425 A | 11/2004 |
| KR | 1020040095853 A | 11/2004 |

OTHER PUBLICATIONS

Machine Translation of JP 2003-257479 published Sep. 12, 2003.*
Machine Translation of JP 2004-342607 published Dec. 2, 2004.*
ChemDraw Ultra 10.0 Name to Structure Conversion—Created Sep. 25, 2009.*
International Search Report dated Apr. 26, 2007 for Application No. PCT-KR2007/000386 (All references cited in Search Report are listed above).

* cited by examiner

*Primary Examiner*—Robert Hodge
(74) *Attorney, Agent, or Firm*—Cantor Colburn LLP

(57) ABSTRACT

Disclosed are nonaqueous electrolyte additives, which can improve the safety of a battery upon overcharge of the battery without reducing the performance of the battery, as well as a nonaqueous electrolyte comprising the additives, and a lithium secondary battery comprising the nonaqueous electrolyte. More particularly, disclosed are a nonaqueous electrolyte comprising both fluorobiphenyl and fluorotoluene as additives, and a lithium secondary battery comprising the nonaqueous electrolyte.

14 Claims, 1 Drawing Sheet

NON-AQUEOUS-ELECTROLYTE AND LITHIUM SECONDARY BATTERY USING THE SAME

This application claims the benefit of the filing date of Korean Patent Application No. 2006-6692, filed on Jan. 23, 2006, in the Korean Intellectual Property Office, the disclosure of which is incorporated herein in its entirety by reference.

TECHNICAL FIELD

The present invention relates to nonaqueous electrolyte additives, a nonaqueous electrolyte comprising the nonaqueous electrolyte additives and a lithium secondary battery comprising the nonaqueous electrolyte. More particularly, it relates to a nonaqueous electrolyte comprising fluorobiphenyl and fluorotoluene as nonaqueous electrolyte additives, which can improve the stability of a battery upon overcharge without reducing the performance of the battery, and to a lithium secondary battery comprising such a nonaqueous electrolyte.

BACKGROUND ART

Recently, as electrolytes for lithium ion secondary batteries, nonaqueous electrolytes, comprising a nonaqueous electrolyte compound, a lithium salt, and if necessary, other additives, have been used.

The nonaqueous electrolyte compound can generally consist of a combination of cyclic carbonate and linear carbonate. Examples of the cyclic carbonate include ethylene carbonate (EC), propylene carbonate (PC), and gamma-butyrolactone (GBL), and examples of the linear carbonate include diethyl carbonate (DEC), dimethyl carbonate (DMC), and ethyl methyl carbonate (EMC).

The lithium salt is used to supply lithium ions to electrolytes, and other additives are selectively used to improve the performance of electrolytes and batteries.

In the nonaqueous electrolyte lithium secondary battery, the safety of the battery in an overcharged state generally becomes the greatest problem. Among the causes of the safety problem, an important cause is an exothermic reaction resulting from structural degradation of the cathode. The exothermic reaction occurs based on the following principles.

A cathode material consisting of, for example, lithium-containing metal oxide capable of absorbing and releasing lithium and/or lithium ions, is changed into a thermodynamically unstable structure as a result of the deintercalation of lithium ions when the battery is overcharged. When the temperature of the battery in this overcharged state reaches the critical temperature due to external physical impact, for example, exposure to high temperatures, oxygen will be released from the cathode material having the unstable structure. The released oxygen will cause an exothermic decomposition reaction with, for example, an electrolyte solvent, and the exothermic decomposition of the electrolyte, caused by this reaction, will be accelerated by oxygen released from the cathode. Due to such successive exothermic decomposition reactions, the battery will undergo thermal runaway, leading to ignition and explosion.

In attempts to control the above-described ignition or explosion resulting from the temperature rise in the battery, many solutions have been suggested, and one example thereof is a method that uses additives (nonaqueous electrolyte additives). As the nonaqueous electrolyte additives, additives are known, which use redox shuttle mechanisms, for example, chloroanisole, and additives that use polymerization mechanisms, for example, alkylbenzene derivatives, such as cyclohexylbenzene, and biphenyl.

Specifically, as an additive for improving the safety of a battery upon overcharge of the battery, a material undergoing oxidation-reduction cycling, for example, chloroanisole, is sometimes used, but this material has a problem in that it is not effective when the charge current of the battery is high. As another method, there is a method in which the monomer of a conductive polymer, such as biphenyl that can block the flow of electric current by forming a blocking layer through the polymerization thereof upon overcharge of the battery, is added to an electrolyte. However, in the case where the monomer of the conductive polymer, such as biphenyl, is used, there are problems in that the performance of the battery will be deteriorated due to an increase in resistance, and the monomer should be used in a large amount to ensure sufficient safety.

DISCLOSURE OF THE INVENTION

The present inventors have conducted studies to solve the above-described problem occurring in the prior art, and to develop a material capable of forming a safer blocking layer in an electrolyte when a battery is overcharged.

As a result, the present inventors have found that when biphenyl and toluene substituted with fluorine, i.e., fluorobiphenyl and fluorotoluene are used together, they can safely protect a battery when the battery is overcharged, thereby completing the present invention.

Accordingly, it is an object of the present invention to provide nonaqueous electrolyte additives capable of increasing the safety of a battery when the battery is overcharged, and a nonaqueous electrolyte comprising said additives.

Another object of the present invention is to provide a lithium secondary battery comprising said nonaqueous electrolyte.

To achieve the above objects, in one embodiment, the present invention provides a nonaqueous electrolyte for lithium secondary batteries, which comprises a lithium salt and an electrolyte compound, the nonaqueous electrolyte comprising fluorobiphenyl and fluorotoluene as additives.

In another embodiment, the present invention provides a nonaqueous electrolyte for lithium secondary batteries comprising a lithium salt and an electrolyte compound, wherein the nonaqueous electrolyte comprises an additive that forms a passivation layer by oxidation when the battery is overcharged and an additive that undergoes an exothermic reaction when the battery is overcharged. According to one embodiment of the present invention, as the additive that forms a passivation layer by oxidation when the battery is overcharged, fluorobiphenyl can be used; and as the additive that undergoes an exothermic reaction when the battery is overcharged, fluorotoluene can be used.

In still another embodiment, the present invention provides a nonaqueous electrolyte comprising: a lithium salt; an electrolyte compound; a first additive that deposits oxidized product or forms a passivation layer by oxidation at a voltage higher than 4.2 V; and a second additive that can shut down a separator by an exothermic reaction at a voltage higher than 4.2 V. According to one embodiment of the present invention, as the first additive deposits oxide or forms a passivation layer by oxidation at a voltage higher than 4.2 V, fluorobiphenyl can be used; and as second additive that can shut down a separator by an exothermic reaction at a voltage higher than 4.2 V, fluorotoluene can be used.

Preferably, said fluorobiphenyl is any one selected from among compounds represented by Formula 1a or 1b below, and said fluorotoluene is any one selected from compounds represented by Formula 2 below:

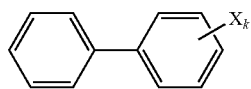

[Formula 1a]

wherein X is fluorine (F), and "k" is an integer ranging from 1 to 5;

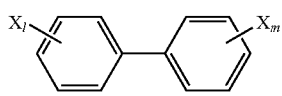

[Formula 1b]

wherein X is fluorine (F), and "l" and "m", which can be the same or different from each other, are independent integers ranging from 1 to 5;

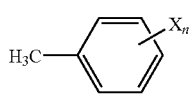

[Formula 2]

wherein X is fluorine (F), and "n" is an integer ranging from 1 to 5.

In another aspect, the present invention provides a lithium secondary battery comprising: a cathode capable of intercalating lithium ions; an anode capable of intercalating lithium ions; a porous separator; and a nonaqueous electrolyte comprising a lithium salt, an electrolyte compound, fluorobiphenyl and fluorotoluene.

Hereinafter, the present invention will be described in detail.

The nonaqueous electrolyte of the present invention comprises both fluorobiphenyl and fluorotoluene as additives. Said fluorobiphenyl and fluorotoluene are fluoro-substituted aromatic compounds, and when they are used together in a nonaqueous electrolyte, the range of the safety of a battery in an overcharged state can be enlarged.

The use of fluorobiphenyl and fluorotoluene in the present invention is excellent with respect to the effect of improving the safety of the battery, compared to the use of biphenyl and toluene unsubstituted with fluorine. Also, it is to be understood that, if said biphenyl-based compound and toluene-based compound, each of which is unsubstituted with fluorine, are used together, they may not exhibit the effect of the additives according to the present invention.

Specifically, the effect of the additives according to the present invention may not be achieved in the following cases: a case in which biphenyl unsubstituted with fluorine and toluene unsubstituted with fluorine are used together as additives; a case in which fluorobiphenyl and toluene unsubstituted with fluorine are used together as additives; and a case in which biphenyl unsubstituted with fluorine and fluorotoluene are used together as additives.

Said fluorobiphenyl will protect an electrode by forming a passivation layer by oxidation when the battery is overcharged, and the passivation layer will serve as a protective layer, which is mainly formed in a cathode such that it will protect the cathode. Meanwhile, said fluorotoluene will undergo an exothermic reaction such that it will be helpful in protecting the battery. The use of fluorobiphenyl together with fluorotoluene provides an advantage capable of improving the overcharge characteristics of the battery without reducing the performance of the battery.

In particular, the formed passivation layer will act as resistance to overcharge to prevent overcharge from further progressing, and to prevent the electrolyte solvent from being degraded by oxidation. Thus, it will inhibit a rapid exothermic reaction and effectively improve overcharge safety.

In forming the above-described passivation layer, a kind of protective layer, oxidation potential is important. The passivation layer is generally formed by polymerization of a monomer; the monomer can be polymerized at or above the oxidation potential thereof. The oxidation potential of said fluorobiphenyl is 4.6 V, and the oxidation potential of said fluorotoluene is 4.75 V. Because the oxidation potentials thereof are higher than those of compounds unsubstituted with fluorine, they can improve the safety of the battery, even when the battery is exposed to high temperatures or cycled. As a result, the battery can stably operate. When the fluorotoluene and the fluorotoluene are used together, they exhibit excellent effect of improving the safety of the battery, compared to the prior electrolyte additives or the biphenyl and toluene unsubstituted with fluorine. Also, when the fluorobiphenyl and the fluorotoluene are used together in the battery, they will not adversely affect the performance of the battery, because electric current greater than the sum of electric currents generated when said compounds are used alone will flow in the battery.

According to one embodiment of the present invention, the fluorobiphenyl can be used in an amount of about 0.1-3 wt % based on the total weight of the nonaqueous electrolyte, and the fluorotoluene can be used in an amount of 3-10 wt % based on the total weight of the nonaqueous electrolyte. In other words, the fluorobiphenyl can be used in an amount higher than 0.1 wt % in order for the effect thereof to be clearly shown, whereas it can be used in an amount lower than 3 wt % in consideration of, for example, an increase in the resistance and cost of the battery, because the additive does not need to be used in excessive amounts. Likewise, the fluorotoluene can be used in an amount higher than 3 wt % in order for the effect thereof to be clearly shown, whereas it can be used in an amount lower than 10 wt % in consideration of, for example, an increase in the resistance and cost of the battery, because the additive does not need to be used in excessive amounts.

Thus, the contents of the additives, which can effectively protect the battery without reducing the performance of the battery, will preferably be determined as described above. The necessary content of each of the additives can be readily determined by a person skilled in the art.

The nonaqueous electrolyte of the present invention contains, as solvents, electrolyte compounds, for example, cyclic carbonate and linear carbonate. According to one embodiment of the present invention, the nonaqueous electrolyte can also contain at least one selected from among cyclic carbonates, and at least one selected from among linear carbonates. Examples of the cyclic carbonate include ethylene carbonate (EC), propylene carbonate (PC), gamma-butyrolactone (GBL), etc. Examples of the linear carbonate include diethyl carbonate (DEC), dimethyl carbonate (DMC), ethyl methyl carbonate (EMC) and methyl propyl carbonate (MPC).

The nonaqueous electrolyte of the present invention contains a lithium salt. For example, it can contain at least one selected from the group consisting of $LiClO_4$, $LiCF_3SO_3$, $LiPF_6$, $LiBF_4$, $LiAsF_6$ and $LiN(CF_3SO_2)_2$. However, the scope of the present invention is not limited to the use of such lithium salts.

In another aspect, the present invention provides a lithium secondary battery comprising said nonaqueous electrolyte, a cathode, an anode and a porous separator. As an active material for the anode, there can be used carbon, a lithium metal or a lithium metal alloy. In addition, it is possible to use, as the anode material, metal oxide such as $TiO_2$ or $SnO_2$, which can reversibly intercalate lithium and have a potential of less than 2V for lithium.

The cathode of the lithium secondary battery can contain, as an active material for the cathode, lithium-containing transition metal oxide. For example, it can contain at least one selected from among $LiCoO_2$, $LiNiO_2$, $LiMn_2O_4$, $LiMnO_2$ and $LiNi_{1-x}Co_xO_2$ (where $0<X<1$). In addition, it is possible to use a cathode material selected from among metal oxides such as $MnO_2$, and combinations thereof.

Moreover, as the porous separator in the lithium secondary battery, it is possible to use, for example, a polyolefin-based porous separator.

The lithium secondary battery of the present invention can be fabricated by interposing the porous separator between the cathode and the anode and injecting said nonaqueous electrolyte comprising the lithium salt, the electrolyte compound and the additives into the resulting structure. The method of fabricating the lithium secondary battery can be selected from among conventional methods widely known in the art.

As the external case of the lithium secondary battery according to the present invention, it is possible to use, for example, a cylindrical shape or polygonal shape made of metal. Also, the secondary battery can be fabricated in a pouch shape.

BEST MODE FOR CARRYING OUT THE INVENTION

Figure 1:
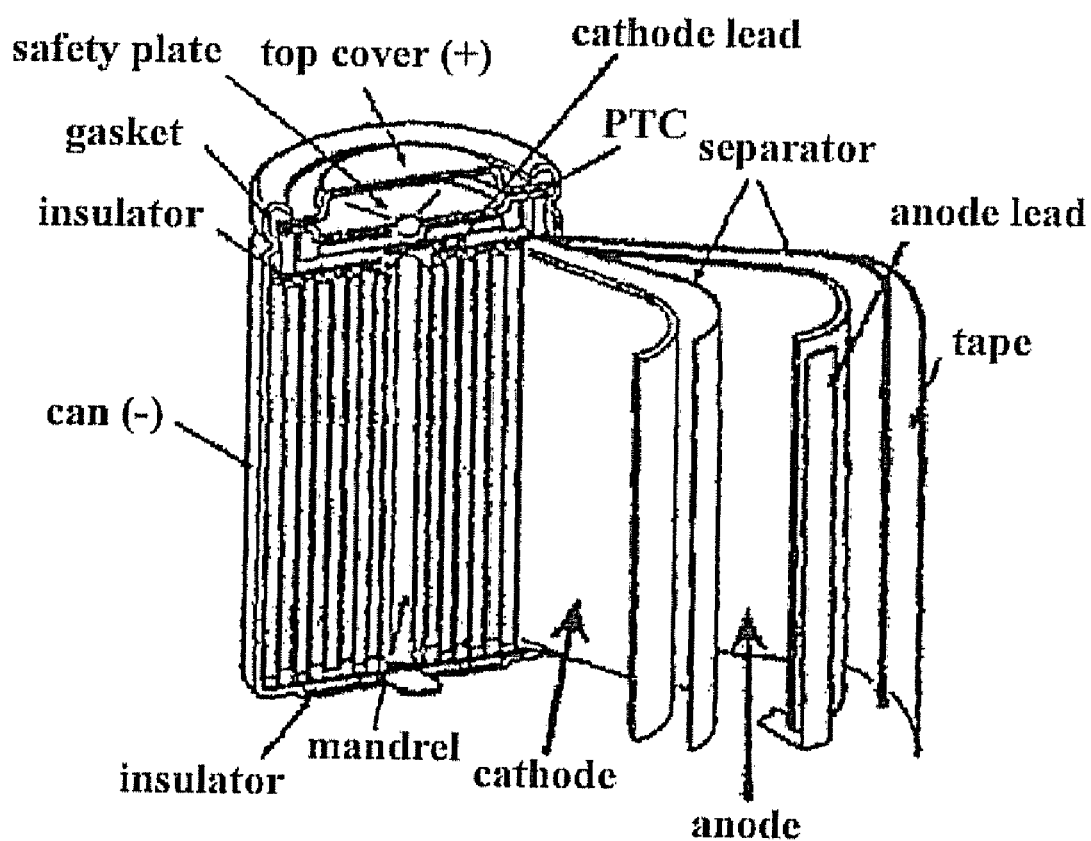
FIG. 1 shows the structure of one example of a secondary battery, which is generally used.

The present invention will be described in further detail with reference to the following examples. It is to be understood, however, that these examples are illustrative only, and the scope of the present invention is not limited thereto.

Examples 1-3

To a 1M $LiPF_6$ solution containing an electrolyte solvent having a composition of EC/PC/DEC=3:2:5, each of 5 wt %, 7 wt % and 10 wt % (Examples 1, 2 and 3, respectively), based on the total weight of an electrolyte, of fluorotoluene and 1 wt % of fluorobiphenyl were added as additives, thus preparing electrolytes. Herein, 4-fluorotoluene (n=1) was used as the fluorotoluene, and 4-fluorobiphenyl (n=1) was used as the fluorobiphenyl.

An anode was prepared using synthetic graphite, and a cathode was prepared using $LiCoO_2$. Then, model number 383562-type polymer batteries were fabricated using said electrolytes, the cathode and the anode, according to a conventional method. The fabricated batteries were subjected to an overcharge test.

Examples 4-6

Batteries were fabricated in the same manner as in Examples 1-3, except that, to the 1M $LiPF_6$ solution containing an electrolyte solvent having a composition of EC/PC/DEC=3:2:5, each of 1 wt %, 1.5 wt % and 2 wt % (Examples 4, 5 and 6, respectively) of fluorobiphenyl, and 5 wt % of fluorotoluene, were added as additives, thus preparing electrolytes. The fabricated batteries were subjected to an overcharge test.

Comparative Examples 1-3

Batteries were fabricated in the same manner as in Examples 1-3, except that, to the 1M $LiPF_6$ solution containing an electrolyte solvent having a composition of EC/PC/DEC=3:2:5, each of 5 wt %, 7 wt % and 10 wt % (Comparative Examples 1, 2 and 3, respectively) of fluorotoluene was added as a single additive, thus preparing electrolytes. The fabricated batteries were subjected to an overcharge test.

Comparative Examples 4-6

Batteries were fabricated in the same manner as in Examples 1-3, except that, to the 1M $LiPF_6$ solution containing an electrolyte solvent having a composition of EC/PC/DEC=3:2:5, each of 1 wt %, 1.5 wt % and 2 wt % (Comparative Examples 4, 5 and 6, respectively) of fluorobiphenyl was added as a single additive, thus preparing electrolytes. The fabricated batteries were subjected to an overcharge test.

Comparative Examples 7-9

Batteries were fabricated in the same manner as in Examples 1-3, except that, to the 1M $LiPF_6$ solution containing an electrolyte solvent having a composition of EC/PC/DEC=3:2:5, each of 5 wt %, 7 wt % and 10 wt % (Comparative Examples 7, 8 and 9, respectively) of toluene, and 1 wt % of fluorobiphenyl, were added as additives, thus preparing electrolytes. The fabricated batteries were subjected to an overcharge test.

Comparative Examples 10-12

Batteries were fabricated in the same manner as in Examples 1-3, except that, to the 1M $LiPF_6$ solution containing an electrolyte solvent having a composition of EC/PC/DEC=3:2:5, each of 1 wt %, 1.5 wt % and 2 wt % (Comparative Examples 10, 11 and 12, respectively) of fluorobiphenyl, and 5 wt % of toluene, were added as additives, thus preparing electrolytes. The fabricated batteries were subjected to an overcharge test.

Comparative Examples 13-15

Batteries were fabricated in the same manner as in Examples 1-3, except that, to the 1M $LiPF_6$ solution containing an electrolyte solvent having a composition of EC/PC/DEC=3:2:5, each of 5 wt %, 7 wt % and 10 wt % (Comparative Examples 13, 14 and 15, respectively) of fluorotoluene, and 1 wt % of biphenyl, were added as additives, thus preparing electrolytes. The fabricated batteries were subjected to an overcharge test.

Comparative Examples 16-18

Batteries were fabricated in the same manner as in Examples 1-3, except that, to the 1M $LiPF_6$ solution containing an electrolyte solvent having a composition of EC/PC/DEC=3:2:5, each of 1 wt %, 1.5 wt % and 2 wt % (Comparative Examples 16, 17 and 18, respectively) of biphenyl, and 5 wt % of fluorotoluene, were added as additives, thus preparing electrolytes. The fabricated batteries were subjected to an overcharge test.

Comparative Example 19

A battery was fabricated in the same manner as in Examples 1-3, except that the additives (fluorobiphenyl and fluorotoluene) were not added to the 1M LiPF$_6$ solution. The fabricated battery was subjected to an overcharge test.

Test Example 1

Overcharge Test (12V/1 A)

The overcharge test of each of the batteries fabricated in Examples 1-6 and Comparative Examples 1-19 above were repeated 20 times in conditions of 12V/1 A. The number of safety tests that each of the batteries passed is shown in Table 1 below.

As can be seen in Table 1, the use of the additives according to the present invention provided excellent safety for the batteries. In other words, the batteries fabricated in Examples 1-6 had improved safety when overcharged, compared to the batteries of Comparative Examples 1-19.

TABLE 1

| Batteries | Additives (wt %) | Number of passed tests |
|---|---|---|
| Example 1 | 1% fluorobiphenyl, 5% fluorotoluene | 20/20 |
| Example 2 | 1% fluorobiphenyl, 7% fluorotoluene | 20/20 |
| Example 3 | 1% fluorobiphenyl, 10% fluorotoluene | 20/20 |
| Example 4 | 1% fluorobiphenyl, 5% fluorotoluene | 20/20 |
| Example 5 | 1.5% fluorobiphenyl, 5% fluorotoluene | 20/20 |
| Example 6 | 2% fluorobiphenyl, 5% fluorotoluene | 20/20 |
| Comparative Example 1 | 0% fluorobiphenyl, 5% fluorotoluene | 0/20 |
| Comparative Example 2 | 0% fluorobiphenyl, 7% fluorotoluene | 17/20 |
| Comparative Example 3 | 0% fluorobiphenyl, 10% fluorotoluene | 19/20 |
| Comparative Example 4 | 1% fluorobiphenyl, 0% fluorotoluene | 0/20 |
| Comparative Example 5 | 1.5% fluorobiphenyl, 0% fluorotoluene | 0/20 |
| Comparative Example 6 | 2% fluorobiphenyl, 0% fluorotoluene | 0/20 |
| Comparative Example 7 | 1% fluorobiphenyl, 5% toluene | 0/20 |
| Comparative Example 8 | 1% fluorobiphenyl, 7% toluene | 0/20 |
| Comparative Example 9 | 1% fluorobiphenyl, 10% toluene | 0/20 |
| Comparative Example 10 | 1% fluorobiphenyl, 5% toluene | 0/20 |
| Comparative Example 11 | 1.5% fluorobiphenyl, 5% toluene | 0/20 |
| Comparative Example 12 | 2% fluorobiphenyl, 5% toluene | 0/20 |
| Comparative Example 13 | 1% biphenyl, 5% fluorotoluene | 0/20 |
| Comparative Example 14 | 1% biphenyl, 7% fluorotoluene | 18/20 |
| Comparative Example 15 | 1% biphenyl, 10% fluorotoluene | 19/20 |
| Comparative Example 16 | 1% biphenyl, 5% fluorotoluene | 3/20 |
| Comparative Example 17 | 1.5% biphenyl, 5% fluorotoluene | 4/20 |
| Comparative Example 18 | 2% biphenyl, 5% fluorotoluene | 5/20 |
| Comparative Example 19 | None | 0/20 |

Test Example 2 (12V/2 A)

The overcharge test of each of the batteries fabricated in Examples 1-6 and Comparative Examples 1-19 above were repeated 20 times in conditions of 12V/2 A. The number of safety tests that each of the batteries passed is shown in Table 2 below.

As can be seen in Table 2, the batteries of Examples 1-6 had improved safety when overcharged, compared to the batteries of Comparative Examples 1-19.

Also, the effect of the use of the additives according to the present invention on the improvement in the safety of the battery was more evident from the results of Table 2 compared to the results of Table 1.

TABLE 2

| Batteries | Additives (wt %) | Number of passed tests |
|---|---|---|
| Example 1 | 1% fluorobiphenyl, 5% fluorotoluene | 20/20 |
| Example 2 | 1% fluorobiphenyl, 7% fluorotoluene | 20/20 |
| Example 3 | 1% fluorobiphenyl, 10% fluorotoluene | 20/20 |
| Example 4 | 1% fluorobiphenyl, 5% fluorotoluene | 20/20 |
| Example 5 | 1.5% fluorobiphenyl, 5% fluorotoluene | 20/20 |
| Example 6 | 2% fluorobiphenyl, 5% fluorotoluene | 20/20 |
| Comparative Example 1 | 0% fluorobiphenyl, 5% fluorotoluene | 0/20 |
| Comparative Example 2 | 0% fluorobiphenyl, 7% fluorotoluene | 0/20 |
| Comparative Example 3 | 0% fluorobiphenyl, 10% fluorotoluene | 0/20 |
| Comparative Example 4 | 1% fluorobiphenyl, 0% fluorotoluene | 0/20 |
| Comparative Example 5 | 1.5% fluorobiphenyl, 0% fluorotoluene | 0/20 |
| Comparative Example 6 | 2% fluorobiphenyl, 0% fluorotoluene | 0/20 |
| Comparative Example 7 | 1% fluorobiphenyl, 5% toluene | 1/20 |
| Comparative Example 8 | 1% fluorobiphenyl, 7% toluene | 1/20 |

TABLE 2-continued

| Batteries | Additives (wt %) | Number of passed tests |
|---|---|---|
| Comparative Example 9 | 1% fluorobiphenyl, 10% toluene | 1/20 |
| Comparative Example 10 | 1% fluorobiphenyl, 5% toluene | 1/20 |
| Comparative Example 11 | 1.5% fluorobiphenyl, 5% toluene | 2/20 |
| Comparative Example 12 | 2% fluorobiphenyl, 5% toluene | 3/20 |
| Comparative Example 13 | 1% biphenyl, 5% fluorotoluene | 0/20 |
| Comparative Example 14 | 1% biphenyl, 7% fluorotoluene | 0/20 |
| Comparative Example 15 | 1% biphenyl, 10% fluorotoluene | 0/20 |
| Comparative Example 16 | 1% biphenyl, 5% fluorotoluene | 0/20 |
| Comparative Example 17 | 1.5% biphenyl, 5% fluorotoluene | 0/20 |
| Comparative Example 18 | 2% biphenyl, 5% fluorotoluene | 0/20 |
| Comparative Example 19 | None | 0/20 |

INDUSTRIAL APPLICABILITY

As can be seen from the foregoing, when the additives according to the present invention are used, the additives will react with oxygen earlier than an electrolyte solvent when a battery is overcharged, thus forming an oxide protective layer acting as resistance. Accordingly, the additives will block electric current to improve the safety of the battery.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A nonaqueous electrolyte for a lithium secondary battery, the nonaqueous electrolyte comprising:
   a lithium salt; and
   an electrolyte compound;
   a first additive, which forms a passivation layer by oxidation when a battery, which comprises the nonaqueous electrolyte, is overcharged; and
   a second additive, which undergoes an exothermic reaction when the battery is overcharged,
   wherein the first additive is a fluorobiphenyl compound and is contained in an amount of 0.1 weight percent to 3 weight percent, based on the total weight of the nonaqueous electrolyte, and the second additive is a fluorotoluene compound and is contained in an amount of 3 weight percent to 10 weight percent, based on the total weight of the nonaqueous electrolyte.

2. The nonaqueous electrolyte according to claim 1, wherein the fluorobiphenyl compound is any one selected from among compounds represented by Formula 1a or 1b below:

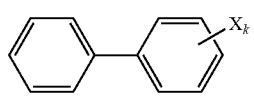

[Formula 1a]

wherein X is fluorine (F), and "k" is an integer ranging from 1 to 5; and

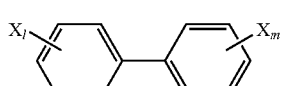

[Formula 1b]

wherein X is fluorine (F), and "l" and "m", which can be the same or different from each other, are independent integers ranging from 1 to 5.

3. The nonaqueous electrolyte according to claim 1, wherein the fluorotoluene compound is any one selected from among compounds represented by Formula 2 below:

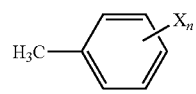

[Formula 2]

wherein X is fluorine (F), and "n" is an integer ranging from 1 to 5.

4. The nonaqueous electrolyte according to claim 1, wherein the lithium salt is at least one selected from the group consisting of $LiClO_4$, $LiCF_3SO_3$, $LiPF_6$, $LiBF_4$, $LiAsF_6$ and $LiN(CF_3SO_2)_2$.

5. The nonaqueous electrolyte according to claim 1, wherein the electrolyte compound comprises at least one cyclic carbonate selected from the group consisting of ethylene carbonate (EC), propylene carbonate (PC) and gamma-butyrolactone (GBL); and at least one linear carbonate selected from the group consisting of diethyl carbonate (DEC), dimethyl carbonate (DMC), ethyl methyl carbonate (EMC) and methyl propyl carbonate.

6. The nonaqueous electrolyte according to claim 1, wherein the fluorobiphenyl compound forms a passivation layer by oxidation at a voltage higher than 4.2V, and the fluorotoluene compound undergoes an exothermic reaction at a voltage higher than 4.2V, which shuts down a separator of the lithium battery.

7. A lithium secondary battery comprising:
   a cathode capable of intercalating lithium ions;
   an anode capable of intercalating lithium ions;
   a porous separator; and
   a nonaqueous electrolyte comprising
      a lithium salt,
      an electrolyte compound,
      a first additive, which forms a passivation layer by oxidation when a battery, which comprises the nonaqueous electrolyte, is overcharged; and
      a second additive, which undergoes an exothermic reaction when the battery is overcharged,
      wherein the first additive is a fluorobiphenyl compound and is contained in an amount of 0.1 weight percent to 3 weight percent, based on the total weight of the nonaqueous electrolyte, and the second additive is a fluorotoluene compound and is contained in an amount of 3 weight percent to 10 weight percent, based on the total weight of the nonaqueous electrolyte.

8. The lithium secondary battery according to claim 7, wherein the cathode comprises at least one cathode material selected from the group consisting of $LiCoO_2$, $LiNiO_2$, $LiMn_2O_4$ $LiNi_{1-x}CO_xO_2$ (where $0<X<1$) and $MnO_2$.

9. The lithium secondary battery according to claim 7, wherein the anode comprises, as an anode material, carbon, lithium, a lithium metal, a lithium metal alloy, $TiO_2$ or $SnO_2$.

10. The lithium secondary battery according to claim 7, wherein the fluorobiphenyl compound is any one selected from among compounds represented by Formula 1a or 1b below:

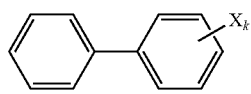

[Formula 1a]

wherein X is fluorine (F), and "k" is an integer ranging from 1 to 5; and

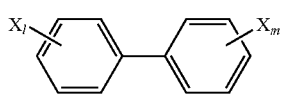

[Formula 1b]

wherein X is fluorine (F), and "l" and "m", which can be the same or different from each other, are independent integers ranging from 1 to 5.

11. The lithium secondary battery according to claim 7, wherein the fluorotoluene compound is any one selected from among compounds represented by Formula 2 below:

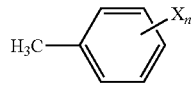

[Formula 2]

wherein X is fluorine (F), and "n" is an integer ranging from 1 to 5.

12. The lithium secondary battery according to claim 7, wherein the lithium salt is one or more selected from the group consisting of $LiClO_4$, $LiCF_3SO_3$, $LiPF_6$, $LiBF_4$, $LiAsF_6$ and $LiN(CF_3SO_2)_2$.

13. The lithium secondary battery according to claim 7, wherein the electrolyte compound comprises at least one cyclic carbonate selected from the group consisting of ethylene carbonate (EC), propylene carbonate (PC) and gamma-butyrolactone (GBL); and at least one linear carbonate selected from the group consisting of diethyl carbonate (DEC), dimethyl carbonate (DMC), ethyl methyl carbonate (EMC) and methyl propyl carbonate.

14. The lithium secondary battery according to claim 7, wherein the fluorobiphenyl compound forms a passivation layer by oxidation at a voltage higher than 4.2V, and the fluorotoluene compound undergoes an exothermic reaction at a voltage higher than 4.2V, which shuts down a separator of the lithium battery.

* * * * *